(12) United States Patent
Chiu et al.

(10) Patent No.: US 9,201,418 B1
(45) Date of Patent: Dec. 1, 2015

(54) SERVO MOTOR DRIVE

(71) Applicants: Yu-Chuan Chiu, Taichung (TW); Yu-Yuan Lin, Taichung (TW)

(72) Inventors: Yu-Chuan Chiu, Taichung (TW); Yu-Yuan Lin, Taichung (TW)

(73) Assignee: INNOSERV FA INC., Tortola (VG)

( * ) Notice: Subject to any disclaimer, the term of this patent is extended or adjusted under 35 U.S.C. 154(b) by 24 days.

(21) Appl. No.: 14/275,875

(22) Filed: May 12, 2014

(51) Int. Cl.
| | |
|---|---|
| G05B 11/32 | (2006.01) |
| G05B 19/29 | (2006.01) |
| G05B 11/01 | (2006.01) |
| G05B 19/40 | (2006.01) |
| G05B 19/19 | (2006.01) |
| G05B 6/02 | (2006.01) |
| G05B 15/02 | (2006.01) |

(52) U.S. Cl.
CPC .......... *G05B 19/19* (2013.01); *G05B 6/02* (2013.01); *G05B 15/02* (2013.01)

(58) Field of Classification Search
CPC .................. G05B 19/19; G05B 2219/50216; G05B 19/416; G05B 19/4141
USPC .......................................... 318/601, 625, 560
See application file for complete search history.

(56) References Cited

U.S. PATENT DOCUMENTS

| | | | | |
|---|---|---|---|---|
| 6,791,294 | B1* | 9/2004 | Kazama et al. | 318/677 |
| 7,194,321 | B2* | 3/2007 | Sun et al. | 318/400.01 |
| 7,268,515 | B1* | 9/2007 | Tsai et al. | 318/801 |
| 2011/0254480 | A1* | 10/2011 | Chen et al. | 318/400.13 |
| 2011/0254485 | A1* | 10/2011 | Clothier et al. | 318/400.14 |
| 2011/0266984 | A1* | 11/2011 | Watanabe et al. | 318/400.21 |
| 2012/0079821 | A1* | 4/2012 | Mazumdar | 60/421 |
| 2013/0002184 | A1* | 1/2013 | Bates et al. | 318/495 |
| 2013/0003218 | A1* | 1/2013 | Bates et al. | 360/73.06 |

* cited by examiner

*Primary Examiner* — Eduardo Colon Santana
*Assistant Examiner* — Gabriel Agared

(57) ABSTRACT

A servo motor drive is connected with at least two servo motors and contains: a main control unit, a power unit, and at least one servo drive module. Each servo drive module includes a communication interface unit, an input/output unit, a microprocessing unit, a field-programmable gate array, a current control unit, and a switching unit. The communication interface unit is electrically connected between the main control unit and the microprocessing unit. The input/output unit is electrically connected between the main control unit and the field-programmable gate array. The field-programmable gate array converts data of the at least two servo motors into digital data.

6 Claims, 4 Drawing Sheets

SERVO MOTOR DRIVE

FIELD OF THE INVENTION

The present invention relates to a servo driving device, and more particularly to a servo motor drive which connects with at least two servo motors by ways of a drive to save cost.

BACKGROUND OF THE INVENTION

In recent years, machinery and equipment are developed quickly. Taking CNC machine tool for example, a machining process is executed by CAD/CAM instruction program based on a specification of a workpiece to plan and design a tool profile and machining path, and a control unit of the machine interprets corresponding instruction program, the servo drive outputs the corresponding instruction program in a pulse command manner, an analog voltage manner or a network communication manner, and a servo motor is driven so that a coding signal from an encoder in the servo motor is transmitted back to the servo drive, thus machining the workpiece.

To machine the workpiece efficiently on a single machine with multi-spindles, a multi-spindle control system is developed, and a digital controlling system is employed to control a plurality of servo drives, and each servo drive controls a servo motor on each spindle. However, such a configuration will occupy space and enhance cost. To overcome such a problem, the plurality of servo drives are series connected together by means of a coaxial cable or a fiber optic cable, for instance, a drive is in connection with one of the plurality of servo drives but not a drive is joined with one servo motor, thereby increasing configuration space and cost.

TW Pub. No. I308819 disclosed a triple AC servo drive in which plural power modules and plural control modules are fixed in a module block to supply power toward plural servo motors, thus eliminating repeated parts, such as a communication interface, a display unit, and an input/output unit. Also, a power capacity of an IGBT module on each power module is reduced, and a size of the plural power modules is decreased to save cost, cable arrangement, and installation time. Nevertheless, the plural servo motors in the power module are controlled by matching with plural inverts and plural current sensors, thus increasing a size of each power module. In addition, each inverter is expensive because of its circuit at high current and high power, thus increasing production cost. A brake unit is mounted in each power module to release electric energy when a voltage in USD is high, thereby wasting power consumption.

Thereby, the servo drive is coupled with plural servo motors by increasing the plural power modules, thus enhancing production cost and wasting manufacture time.

The present invention has arisen to mitigate and/or obviate the afore-described disadvantages.

SUMMARY OF THE INVENTION

The primary object of the present invention is to provide a servo motor drive which controls a switching unit to drive at least two servo motors by ways of an intelligent power module to save production cost and to reduce a size.

Another object of the present invention is to provide a servo motor drive which contains a revive brake regeneration mounted on an output end of a power unit, when the at least two servo motors operate at a speed decelerating state, a current is charged back to the power unit to charge power and decrease power consumption.

To obtain the above objectives, a servo motor drive is in connection with at least two servo motors and drives any one of the at least two servo motors after receiving a signal from a main control unit, and the at least two servo motors asynchronously drives at least two controlled objects, the servo motor drive contains: a main control unit, a power unit, and at least one servo drive module.

The power unit is applied to supply power to the at least one servo drive module.

Each of the at least one servo drive module includes a communication interface unit, an input/output unit, a microprocessing unit, a field-programmable gate array, a current control unit, and a switching unit.

The communication interface unit is electrically connected between the main control unit and the microprocessing unit to serially and bilaterally transmit data.

The input/output unit is electrically connected between the main control unit and the field-programmable gate array to bilaterally transmit digital/analog data.

The field-programmable gate array converts rotating angle data and rotating speed data of the at least two servo motors into digital rotating angle data and digital rotating speed data which is then transmitted back to the microprocessing unit to be calculated.

The microprocessing unit is electrically connected with the communication interface unit and the field-programmable gate array and calculates a digital carrier signal to asynchronously control the at least two servo motors according to speed, position and torque command data from the main control unit and the rotating angle data and the rotating speed data of the at least two servo motors which is built in the field-programmable gate array.

The current control unit includes an intelligent power module and a current sensor for sensing an amount of current, the intelligent power module receives digital carrier current data outputted by the microprocessing unit to amplify current power to start the at least two servo motors.

The switching unit drives the intelligent power module to control the switching unit to switch toward one of plural connecting points based on command of the microprocessing unit, such that one of the at least two servo motors is started to operate.

DETAILED DESCRIPTION OF THE PREFERRED EMBODIMENTS

Figure 1:
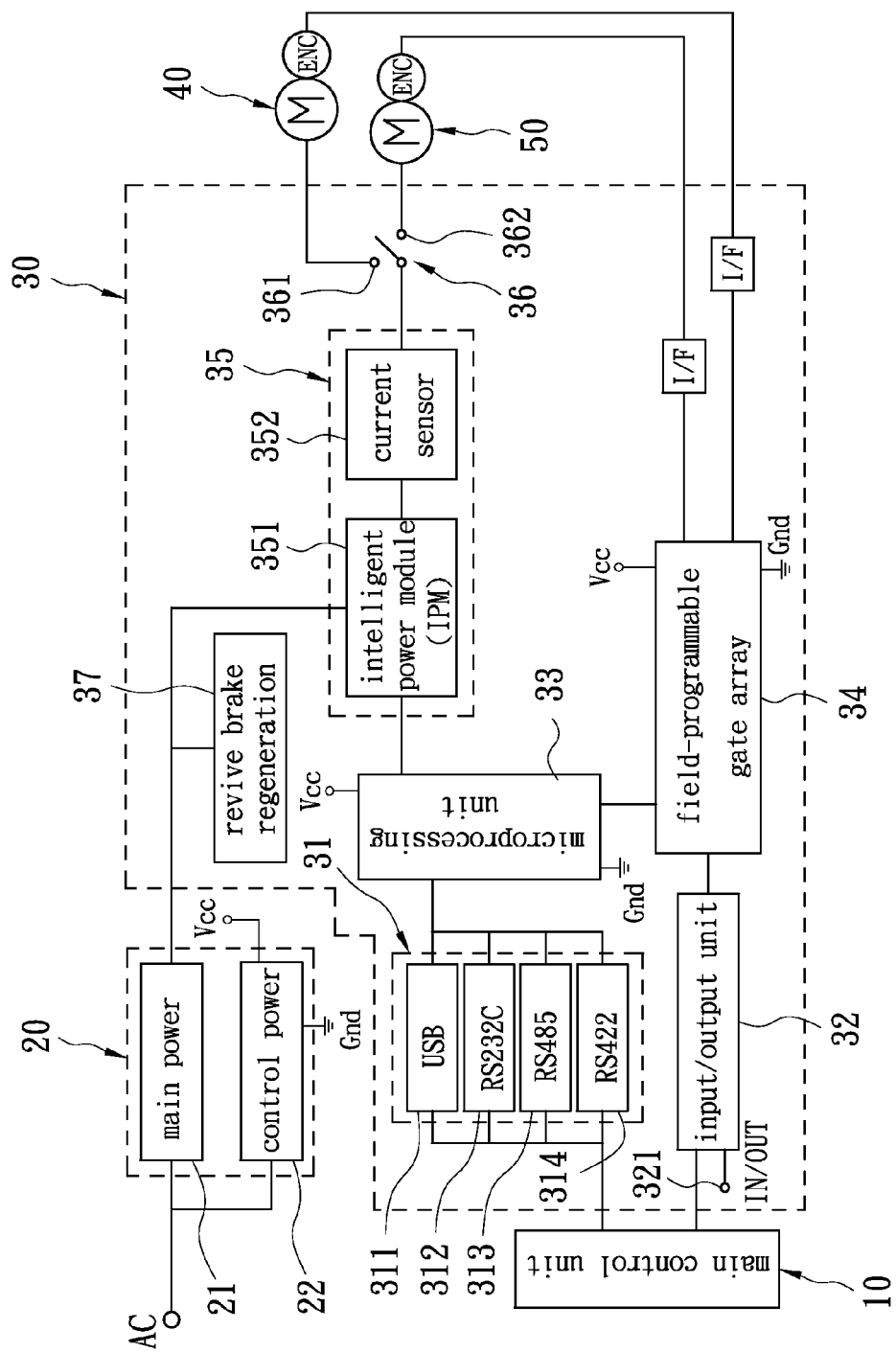
FIG. 1 is a block flow diagram showing a circuit configuration of a servo motor drive according to a preferred embodiment of the present invention.
Figure 2:
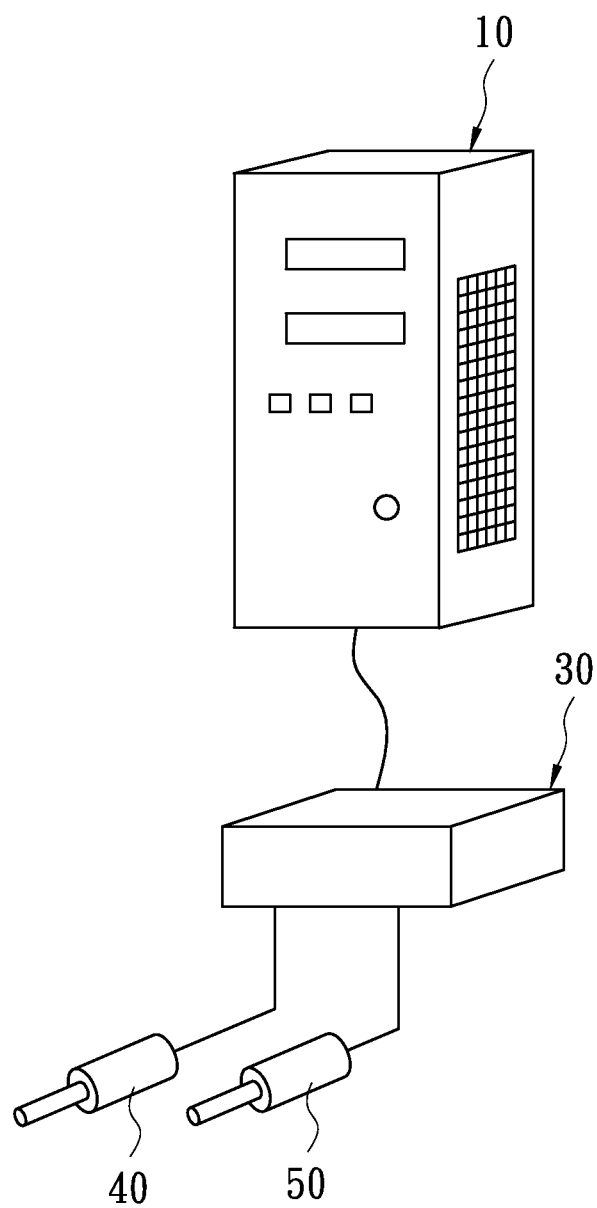
FIG. 2 is a perspective view showing the assembly of the servo motor drive according to the preferred embodiment of the present invention.

With reference to FIGS. 1 and 2, a servo motor drive according to a preferred embodiment of the present invention is in connection with a first servo motor 40 and a second servo motor 50 and drives any one of the first servo motor 40 and the second servo motor 50 after receiving a signal from a main control unit 10, and then the first servo motor 40 and the second servo motor 50 asynchronously drive two different controlled objects (two parts in a machine tool). The servo motor drive comprises: the main control unit 10, a power unit 20, and at least one servo drive module 30. In one embodiment, the servo motor drive is applicable for a tool magazine and an ATC cam box in a CNC machine tool.

The main control unit 10 is a controlling system of the CNC machine tool.

The power unit 20 is applied to supply power to the at least one servo drive module 30. The power unit 20 includes a main power 21 and a control power 22 powered by the main power 21.

Each of the at least one servo drive module 30 includes a communication interface unit 31, an input/output unit 32, a microprocessing unit 33, a field-programmable gate array 34, a current control unit 35, and a switching unit 36.

The communication interface unit 31 is electrically connected between the main control unit 10 and the microprocessing unit 33 to serially and bilaterally transmit data. The communication interface unit 31 includes a universal serial bus (USB) 311, a RS232C serial port 312, a RS485 serial port 313, and a RS422 serial port 314. In addition, the communication interface unit 31 is applied for remote monitoring, such as Mechatrolink, EtherCAT or EtherCAT, be connecting with Ethernet and other industrial control network interfaces.

The input/output unit 32 is electrically connected between the main control unit 10 and the field-programmable gate array 34 to bilaterally transmit digital/analog data. The input/output unit 32 further includes an in/out end 321 so that the microprocessing unit 33 receives an external input signal by using the input/output unit 32 or directly controls an output signal. In application, a signal input portion of the input/output unit 32 is coupled with a sensor, a switch or a button, and a signal output portion of the input/output unit 32 is joined with a solenoid valves or a relay. Furthermore, the input/output unit 32 is capable of handshaking with an external computer.

The control power 22 (Vcc) supplies DC power to the field-programmable gate array (FPGA) 34, and the field-programmable gate array 34 convert rotating angle data and rotating speed data of the first servo motor 40 and the second servo motor 50 into digital rotating angle data and digital rotating speed data which is then transmitted back to the microprocessing unit 33 to be calculated. Preferably, the field-programmable gate array 34 is programmed to change a setting based on various input controlling mode to control operation of the machine tool. Since such a function is well-known, further remarks are omitted.

The control power 22 (Vcc) also supplies the DC power to the microprocessing unit 33, and the microprocessing unit 33 is electrically connected with the communication interface unit 31 and the field-programmable gate array 34 and calculates a digital carrier signal to asynchronously control the first servo motor 40 and the second servo motor 50 according to speed, position and torque command data from the main control unit 10 and the rotating angle data and the rotating speed data of the first servo motor 40 and the second servo motor 50 which is built in the field-programmable gate array 34.

The current control unit 35 includes an intelligent power module (IPM) 351 and a current sensor 352 for sensing an amount of current. The main power 21 supplies AC power to the intelligent power module 351, and the intelligent power module 351 receives digital carrier current data outputted by the microprocessing unit 33 to amplify current power, and then the current power is converted into a voltage signal and is transmitted back to the microprocessing unit 33 through the current sensor 352.

The switching unit 36 drives the intelligent power module 351 to control the switching unit 36 to switch toward one of plural connecting points based on command of the microprocessing unit 33, such that one of the first servo motor 40 and the second servo motor 50 is started to operate. In this embodiment, the switching unit 36 is a change over switch and includes a first contact point 361 and a second contact point 362, and the first contact point 361 connects with the first servo motor 40, the second contact point 362 couples with the second servo motor 50. The change over switch is a contact switch or a silicon controlled rectifier switch (non-contact switch). Due to the contact switch and the silicon controlled rectifier switch are well-known art, further remarks are omitted.

Figure 3:
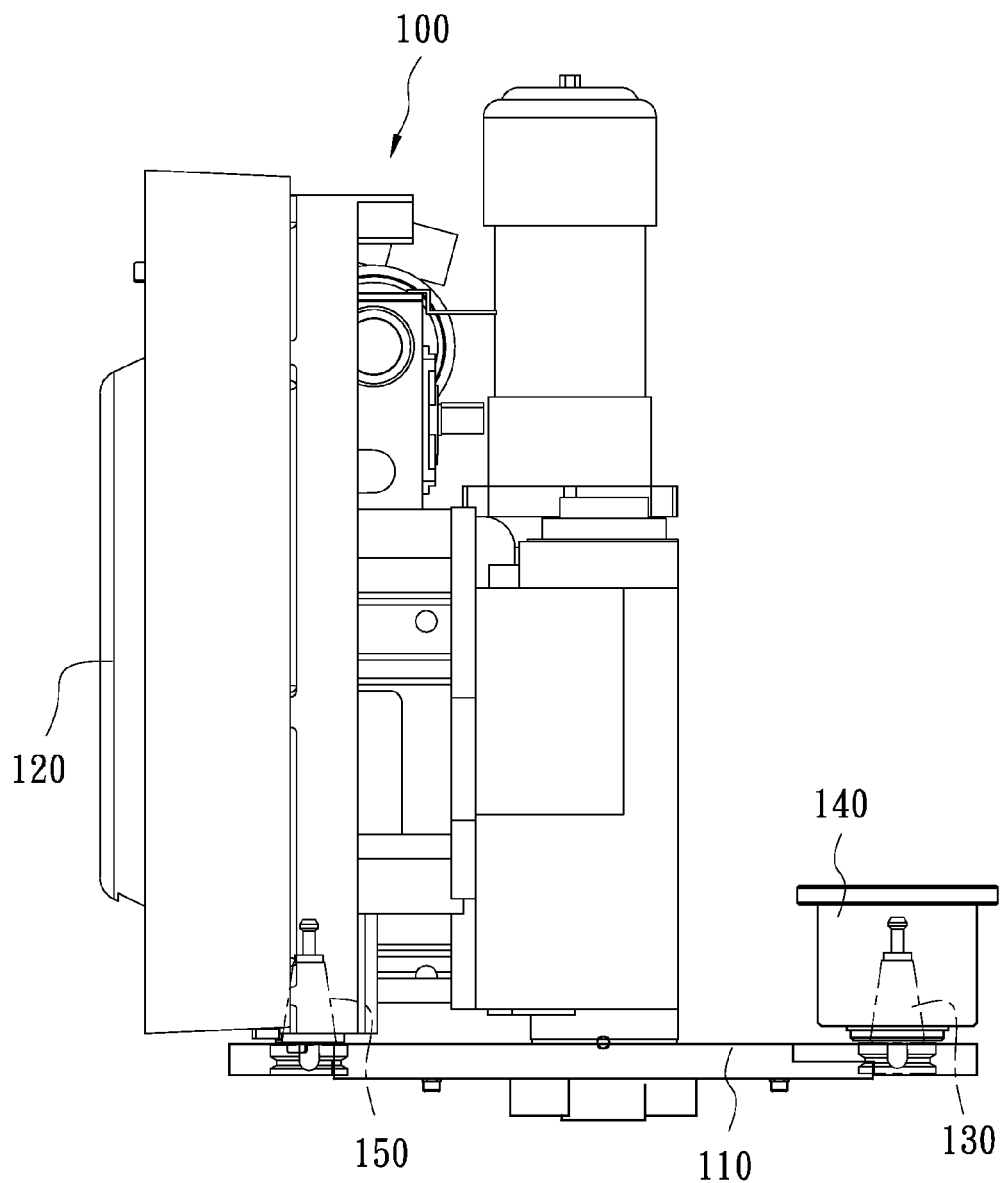
FIG. 3 is a cross sectional view showing the servo motor drive being applied in a tool magazine and an ATC arm according to the preferred embodiment of the present invention.

Referring to FIGS. 1 to 3, when the servo motor drive is applied for the tool magazine in the CNC machine tool in a tool changing process, the first servo motor 40 drives a tool disc of the tool magazine so that a tool in the tool disc is taken out, and the second servo motor 50 is used for a tool release and a tool change. When an ATC arm 110 of the tool machine 100 operates in the tool changing process, an executive command (such as the speed, the position and the torque command data) from the main control unit 10 is transmitted to the microprocessing unit 33 via the communication interface unit 31, and then the intelligent power module 351 amplifies power according to the speed, the position and the torque command data from the main control unit 10 and the rotating angle data and the rotating speed data of the first servo motor 40 and the second servo motor 50 which is built in the field-programmable gate array 34. Thereafter, the switching unit 36 is switched toward the first contact point 361 to start the first servo motor 40, and the tool magazine 120 rotates to select the tool, wherein in a tool selecting process, each servo drive module 30 commands the switching unit 36 to switch toward the second contact point 362 so that the second servo motor 50 is started. In the meantime, the ATC arm 110 starts to release a first tool 130 on a spindle 140, and the tool magazine 120 finishes the tool selecting process, a second tool 150 is rotated downwardly toward a tool change position, thus exchanging the first tool 130 and the second tool 150.

Thereby, one of the at least one servo drive module 30 controls the first servo motor 40 and the second servo motor 50 to asynchronously control the tool selecting process, the tool release, and the tool change, thus changing tool quickly. Preferably, one of the at least one servo drive module 30 is employed to drive and control the tool magazine and the ATC arm, thereby saving production cost and simplifying structure and manufacture.

One of the at least one servo drive module 30 is capable of controlling and switching the first servo motor 40 and the second servo motor 50 by ways of the intelligent power module 351 and the switching unit 36, and the intelligent power module 351 integrates plural control functions, such as control, insulated gate bipolar transistor (IGBT) switches, and circuit protection, to achieve compact size and stable quality. The switching unit 36 is configured easily and modularized to simplify cable arrangement in the tool machine.

Each servo drive module 30 further includes a revive brake regeneration 37 mounted on an output end of the power unit 20, when the first servo motor 40 and the second servo motor 50 operate at a speed decelerating state, the current is charged back to the power unit 20, thus charging power and decreasing power consumption.

Figure 4:
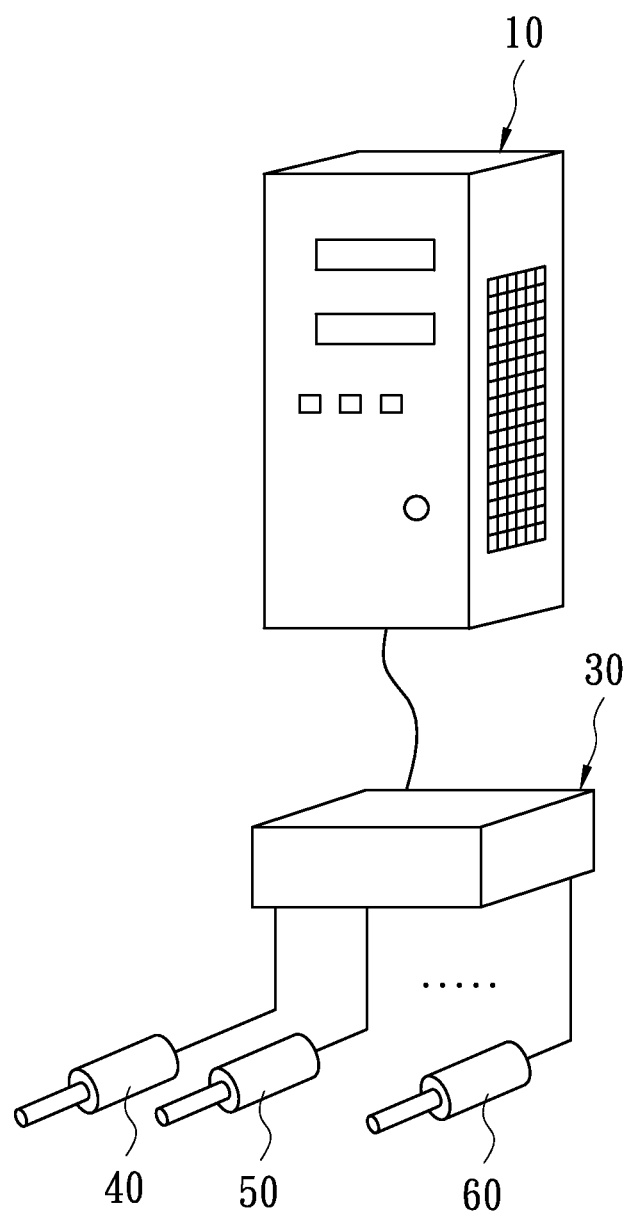
FIG. 4 is another perspective view showing the assembly of the servo motor drive according to the preferred embodiment of the present invention.

It is to be noted that as shown in FIG. 2, a single servo drive module 30 controls the first servo motor 40 and the second servo motor 50 to drive the tool magazine to select the tool and to drive the ATC arm to execute the tool release and the tool change. With reference to FIG. 4, the single servo drive module 30 controls the first servo motor 40, the second servo motor 50, and a third servo motor 60 applicable for multi-spindle tool machines and other tool machines of various types. Accordingly, operation and production cost of the multi-spindle tool machine is simplified and reduced.

To sum up, the intelligent power module of the servo motor drive of the present invention controls the switching unit on basis of the command of the microprocessing unit to drive a plurality of servo motors to save production cost and to reduce size of the machine tool. Furthermore, the revive brake regeneration is mounted on the output end of the power unit, when the plurality of servo motors operate at the speed decelerating state so that the current is charged back to the power unit, thus charging power and decreasing power consumption.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A servo motor drive being in connection with at least two servo motors and driving any one of the at least two servo motors after receiving a signal from a main control unit, and the at least two servo motors asynchronously driving at least two controlled objects, the servo motor drive comprising: a main control unit, a power unit, and at least one servo drive module:

the power unit being applied to supply power to the at least one servo drive module;

each of the at least one servo drive module including a communication interface unit, an input/output unit, a microprocessing unit, a field-programmable gate array, a current control unit, and a switching unit;

the communication interface unit being electrically connected between the main control unit and the microprocessing unit to serially and bilaterally transmit data;

the input/output unit being electrically connected between the main control unit and the field-programmable gate array to bilaterally transmit digital/analog data;

the field-programmable gate array converting rotating angle data and rotating speed data of the at least two servo motors into digital rotating angle data and digital rotating speed data which is then transmitted back to the microprocessing unit to be calculated;

the microprocessing unit being electrically connected with the communication interface unit and the field-programmable gate array and calculating a digital carrier signal to asynchronously control the at least two servo motors according to speed, position and torque command data from the main control unit and the rotating angle data and the rotating speed data of the at least two servo motors which is built in the field-programmable gate array;

the current control unit including an intelligent power module and a current sensor for sensing an amount of current, the intelligent power module receiving digital carrier current data outputted by the microprocessing unit to amplify current power to start the at least two servo motors;

the switching unit driving the intelligent power module to control the switching unit to switch toward one of plural connecting points based on command of the microprocessing unit, such that one of the at least two servo motors is started to operate.

2. The servo motor drive as claimed in claim 1, wherein the power unit includes a main power and a control power powered by the main power, the main power supplies AC power to the intelligent power module, the control power supplies DC power to the microprocessing unit and the field-programmable gate array.

3. The servo motor drive as claimed in claim 1 further comprising a revive brake regeneration mounted on an output end of the power unit, and when the at least two servo motors operate at a speed decelerating state, the current is charged back to the power unit.

4. The servo motor drive as claimed in claim 1, wherein the communication interface unit includes a universal serial bus (USB), a RS232C serial port, a RS485 serial port, and a RS422 serial port 314, and the communication interface unit 31 is connected with Ethernet and industrial control network interfaces, and the industrial control network interfaces has any one of Mechatrolink, EtherCAT and EtherCAT.

5. The servo motor drive as claimed in claim 1, wherein the switching unit is a contact switch or a non-contact switch.

6. A servo motor drive being in connection with at least two servo motors and driving any one of the at least two servo motors after receiving a signal from a main control unit, and the at least two servo motors asynchronously driving at least two parts in a machine tool, the servo motor drive comprising: a main control unit, a power unit, and at least one servo drive module:

the power unit being applied to supply power to the at least one servo drive module;

each of the at least one servo drive module including a communication interface unit, an input/output unit, a microprocessing unit, a field-programmable gate array, a current control unit, and a switching unit;

the communication interface unit being electrically connected between the main control unit and the microprocessing unit to serially and bilaterally transmit data;

the input/output unit being electrically connected between the main control unit and the field-programmable gate array to bilaterally transmit digital/analog data;

the field-programmable gate array converting rotating angle data and rotating speed data of the at least two servo motors into digital rotating angle data and digital rotating speed data which is then transmitted back to the microprocessing unit to be calculated;

the microprocessing unit being electrically connected with the communication interface unit and the field-programmable gate array and calculating a digital carrier signal to asynchronously control the at least two servo motors according to speed, position and torque command data from the main control unit and the rotating angle data and the rotating speed data of the at least two servo motors which is built in the field-programmable gate array;

the current control unit including an intelligent power module and a current sensor for sensing an amount of current, the intelligent power module receiving digital carrier current data outputted by the microprocessing unit to amplify current power to start the at least two servo motors;

the switching unit driving the intelligent power module to control the switching unit to switch toward one of plural connecting points based on command of the microprocessing unit, such that one of the at least two servo motors is started to operate.

* * * * *